(12) United States Patent
Naito et al.

(10) Patent No.: US 9,079,508 B2
(45) Date of Patent: Jul. 14, 2015

(54) FUEL CELL VEHICLE

(71) Applicant: HONDA MOTOR CO., LTD., Tokyo (JP)

(72) Inventors: Hideharu Naito, Utsunomiya (JP); Nariyuki Yoshinaga, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/373,696

(22) PCT Filed: Jan. 28, 2013

(86) PCT No.: PCT/JP2013/051779
§ 371 (c)(1),
(2) Date: Jul. 22, 2014

(87) PCT Pub. No.: WO2013/118602
PCT Pub. Date: Aug. 15, 2013

(65) Prior Publication Data
US 2015/0027796 A1    Jan. 29, 2015

(30) Foreign Application Priority Data

Feb. 7, 2012 (JP) .................................. 2012-024391

(51) Int. Cl.
*B60K 1/04* (2006.01)
*B60L 11/18* (2006.01)
(Continued)

(52) U.S. Cl.
CPC .............. *B60L 11/1883* (2013.01); *B60K 1/04* (2013.01); *B60K 8/00* (2013.01); *B60L 1/003* (2013.01); *B60L 3/0007* (2013.01); *B60L 11/18* (2013.01);
(Continued)

(58) Field of Classification Search
CPC ................ B60K 2001/0411; B60K 2015/0675
USPC ................ 180/232, 65.31, 299, 298; 903/908
See application file for complete search history.

(56) References Cited

U.S. PATENT DOCUMENTS 5,662,184 A * 9/1997 Riemer et al. ................ 180/65.1
6,109,654 A * 8/2000 Yamamoto et al. ........... 280/784
(Continued)

FOREIGN PATENT DOCUMENTS

JP    2002-370544 A    12/2002
JP    2003-173790 A    6/2003
(Continued)

OTHER PUBLICATIONS

International Search Report dated Apr. 23, 2013 corresponding to International Patent Application No. PCT/JP2013/051779 and English translation thereof.
(Continued)

*Primary Examiner* — Jeffrey J Restifo
(74) *Attorney, Agent, or Firm* — Squire Patton Boggs (US) LLP

(57) ABSTRACT

A fuel cell vehicle is provided with a fuel cell stack and a vehicle body frame for mounting the fuel cell stack in a front box. The fuel cell stack and a frame member have portions overlapping with each other in a vehicle width direction in a plan view of the vehicle. A vehicle-forward end portion of the fuel cell stack is positioned closer to the rear of the vehicle than a vehicle-forward end portion of the frame member. A vehicle-rearward end portion of the fuel cell stack is positioned closer to the front of the vehicle than a vehicle-rearward end portion of the frame member.

7 Claims, 13 Drawing Sheets

(51) Int. Cl.
*B60L 1/00* (2006.01)
*B60L 3/00* (2006.01)
*H01M 8/24* (2006.01)
*B60K 8/00* (2006.01)
*H01M 8/10* (2006.01)
*H01M 8/00* (2006.01)
*H01M 8/04* (2006.01)
*B60K 15/067* (2006.01)
*B60K 1/00* (2006.01)

(52) U.S. Cl.
CPC ......... *B60L 11/1896* (2013.01); *B60L 11/1898* (2013.01); *H01M 8/00* (2013.01); *H01M 8/04* (2013.01); *H01M 8/04007* (2013.01); *H01M 8/10* (2013.01); *H01M 8/247* (2013.01); *H01M 8/2465* (2013.01); *B60K 2001/005* (2013.01); *B60K 2001/0411* (2013.01); *B60K 2015/0675* (2013.01); *B60Y 2306/01* (2013.01); *H01M 2250/20* (2013.01); *Y02E 60/50* (2013.01); *Y02T 90/32* (2013.01); *Y02T 90/34* (2013.01)

(56) References Cited

U.S. PATENT DOCUMENTS

| | | | |
|---|---|---|---|
| 6,223,843 B1 * | 5/2001 | O'Connell et al. | 180/65.22 |
| 6,223,844 B1 * | 5/2001 | Greenhill et al. | 429/429 |
| 6,378,637 B1 * | 4/2002 | Ono et al. | 180/65.31 |
| 6,429,019 B1 * | 8/2002 | Goldstein et al. | 436/134 |
| 6,443,253 B1 * | 9/2002 | Whitehead et al. | 180/68.1 |
| 6,494,286 B2 * | 12/2002 | Shimizu et al. | 180/299 |
| 6,994,178 B2 * | 2/2006 | Mizuno | 429/430 |
| 7,144,039 B2 * | 12/2006 | Kawasaki et al. | 280/784 |
| 7,174,977 B2 * | 2/2007 | Enjoji et al. | 180/65.1 |
| 7,222,692 B2 * | 5/2007 | Masuda | 180/291 |
| 7,363,997 B2 * | 4/2008 | Sato et al. | 180/65.31 |
| 7,393,016 B2 * | 7/2008 | Mitsui et al. | 280/784 |
| 7,445,076 B2 * | 11/2008 | Shigematsu | 180/299 |
| 7,484,581 B2 * | 2/2009 | Yamafuji | 180/65.1 |
| 7,717,207 B2 * | 5/2010 | Watanabe et al. | 180/68.5 |
| 7,726,429 B2 * | 6/2010 | Suzuki | 180/232 |
| 7,886,861 B2 * | 2/2011 | Nozaki et al. | 180/232 |
| 8,177,003 B2 * | 5/2012 | Shiomi et al. | 180/65.1 |
| 8,371,406 B2 * | 2/2013 | Masaki et al. | 180/65.31 |
| 8,408,345 B2 * | 4/2013 | Ohashi | 180/68.4 |
| 8,573,344 B2 * | 11/2013 | Hornburg et al. | 180/68.5 |
| 8,616,319 B2 * | 12/2013 | Yokoyama et al. | 180/68.5 |
| 8,985,259 B2 * | 3/2015 | Ozawa et al. | 180/292 |
| 2002/0189873 A1 * | 12/2002 | Mizuno | 180/65.3 |
| 2003/0070858 A1 * | 4/2003 | Kondo | 180/291 |
| 2003/0108784 A1 * | 6/2003 | Enjoji et al. | 429/34 |
| 2003/0148168 A1 * | 8/2003 | Enjoji et al. | 429/38 |
| 2004/0090085 A1 * | 5/2004 | Kawasaki et al. | 296/187.09 |
| 2007/0051549 A1 * | 3/2007 | Fukuda | 180/232 |
| 2008/0023957 A1 * | 1/2008 | Diehl | 280/834 |
| 2012/0080251 A1 * | 4/2012 | Ohashi | 180/65.31 |
| 2012/0103713 A1 * | 5/2012 | Ohashi | 180/68.4 |
| 2014/0335434 A1 * | 11/2014 | Ikeya et al. | 429/435 |
| 2014/0367182 A1 * | 12/2014 | Yoshinaga et al. | 180/68.4 |
| 2015/0027796 A1 * | 1/2015 | Naito et al. | 180/65.31 |

FOREIGN PATENT DOCUMENTS

| | | |
|---|---|---|
| JP | 2007-107478 A | 4/2007 |
| JP | 2011-162108 A | 8/2011 |
| JP | 4784716 B1 | 10/2011 |

OTHER PUBLICATIONS

Rejection of the Application dated Mar. 3, 2015 corresponding to Japanese National-Phase Application No. 2013-557466 and English translation thereof.

* cited by examiner

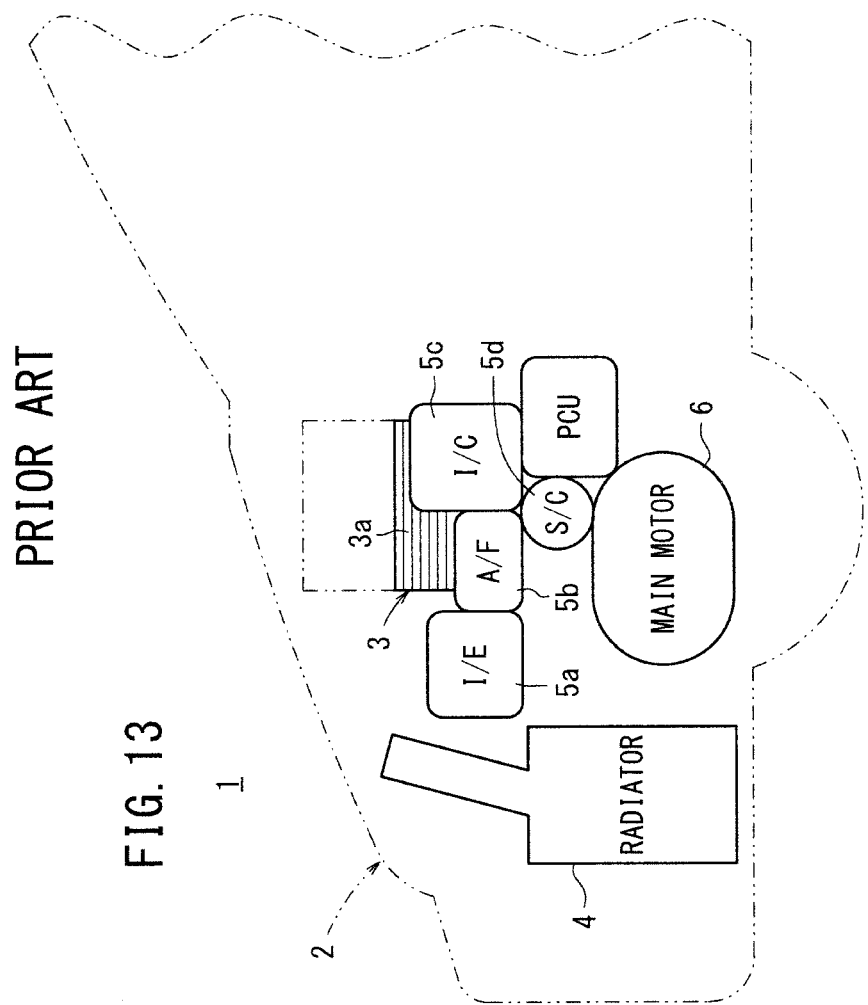

FUEL CELL VEHICLE

TECHNICAL FIELD

The present invention relates to a fuel cell vehicle including a fuel cell stack, a front box, and a vehicle frame for mounting the fuel cell stack in the front box. The fuel cell stack is formed by stacking a plurality of fuel cells. Each of the fuel cells generates electrical energy by electrochemical reactions of a fuel gas and an oxygen-containing gas.

BACKGROUND ART

For example, a solid polymer electrolyte fuel cell employs a polymer ion exchange membrane as an electrolyte membrane, and the electrolyte membrane is interposed between an anode and a cathode to form a membrane electrode assembly (MEA). The membrane electrode assembly and a pair of separators sandwiching the membrane electrode assembly make up a power generation cell. In the fuel cell of this type, in use, typically, a predetermined number of the power generation cells are stacked together to form a fuel cell stack mounted in a vehicle.

The in-vehicle fuel cell stack as described above is used as a component of an in-vehicle fuel cell system as disclosed, e.g., in Japanese Laid-Open Patent Publication No. 2003-173790 (hereinafter referred to as the conventional technique). As shown in FIG. 13, the fuel cell system includes a fuel cell stack 3 mounted in a front box 2 of a vehicle 1. The fuel cell stack 3 is formed by stacking a plurality of fuel cells 3a in a vertical direction.

In the front box 2, a radiator 4 is provided on the front side in the traveling direction, and auxiliary devices such as an ion exchanger 5a, an air filter 5b, an inter cooler 5c, and a super charger 5d are provided adjacent to the rear side of the radiator 4. Further, a main motor 6 as a traction motor is provided adjacent to the lower side of the fuel cell stack 3.

SUMMARY OF INVENTION

In the above conventional technique, various auxiliary devices and the radiator 4 are placed in the front box 2, adjacent to the fuel cell stack 3. Therefore, when an impact load from the outside is applied to the vehicle 1, it is desired to prevent these devices from abutting directly against the fuel cell stack 3. For this purpose, for example, the fuel cell stack 3 may be surrounded by an enclosure with relatively high strength. However, in this case, the entire size of the equipment becomes large.

The present invention has been made to meet the demand of this type, and an object of the present invention is to provide a fuel cell vehicle having simple and economical structure without requiring any enclosure having relatively high strength to cover fuel cells and which is capable of preventing an external load from being directly applied to the fuel cells, and protect the fuel cells reliably.

According to the present invention, there is provided a fuel cell vehicle including a fuel cell stack formed by stacking a plurality of fuel cells, a front box, and a vehicle frame configured to mount the fuel cell stack in the front box. Each of the fuel cells generates electrical energy by electrochemical reactions of a fuel gas and an oxygen-containing gas.

This fuel cell vehicle further includes an impact relaxing mechanism configured to relax an impact applied from the outside. The length of the impact relaxing mechanism is greater than the length of the fuel cell stack in a vehicle front-rear direction. The fuel cell stack and the impact relaxing mechanism have an overlapped portion in which the fuel cell stack and the impact relaxing mechanism are overlapped with each other in a vehicle width direction in a plan view of the fuel cell vehicle. A front end of the fuel cell stack in the vehicle front-rear direction is positioned rearward of a front end of the impact relaxing mechanism in the vehicle front-rear direction, and a rear end of the fuel cell stack in the vehicle front-rear direction is positioned forward of a rear end of the impact relaxing mechanism in the vehicle front-rear direction.

In the present invention, the impact relaxing mechanism is longer than the fuel cell stack in the front-rear direction of the fuel cell vehicle. Further, the fuel cell stack is disposed within an area of the impact relaxing mechanism in a plan view of the vehicle. In the structure, the fuel cell stack does not protrude from the front side of the impact relaxing mechanism or from the rear side thereof in the front-rear direction of the fell cell vehicle.

Thus, when an external load is applied to the fuel cell vehicle in the front-rear direction of the fuel cell vehicle, the external load can be received by the impact relaxing mechanism reliably. Thus, the external load is not directly applied to the fuel cell stack.

Therefore, it is not necessary to use any enclosure having relatively high strength to cover the fuel cell stack. Accordingly, with the simple and economical structure, it becomes possible to prevent the external load from being directly applied to the fuel cells as much as possible, and reliably protect the fuel cells.

BRIEF DESCRIPTION OF DRAWINGS

FIG. 13 is a side view showing main components of an in-vehicle fuel cell system disclosed in a conventional technique.

DESCRIPTION OF EMBODIMENTS

Figure 1:
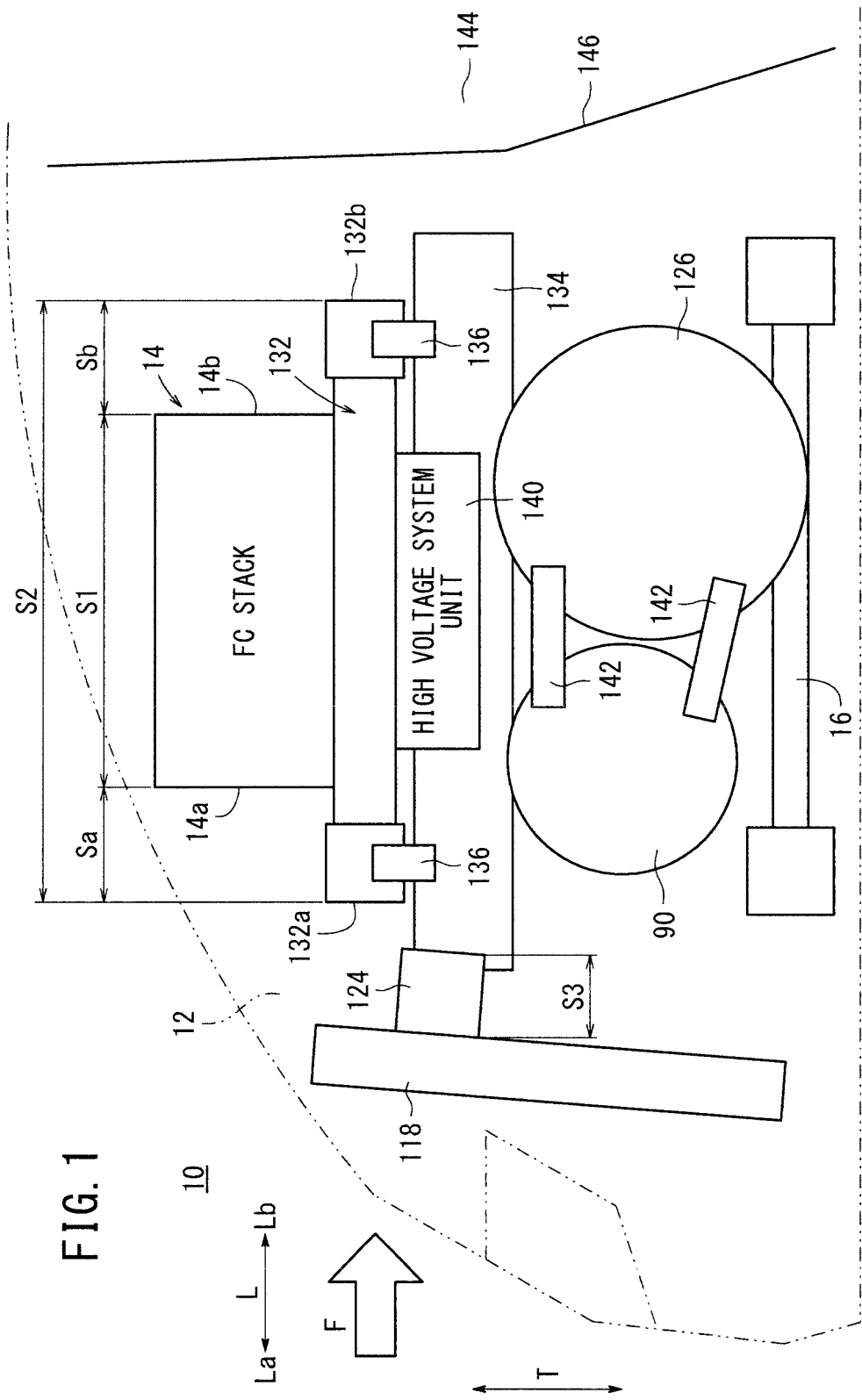
FIG. 1 is a side view showing main components of a fuel cell vehicle according to a first embodiment of the present invention.
Figure 2:
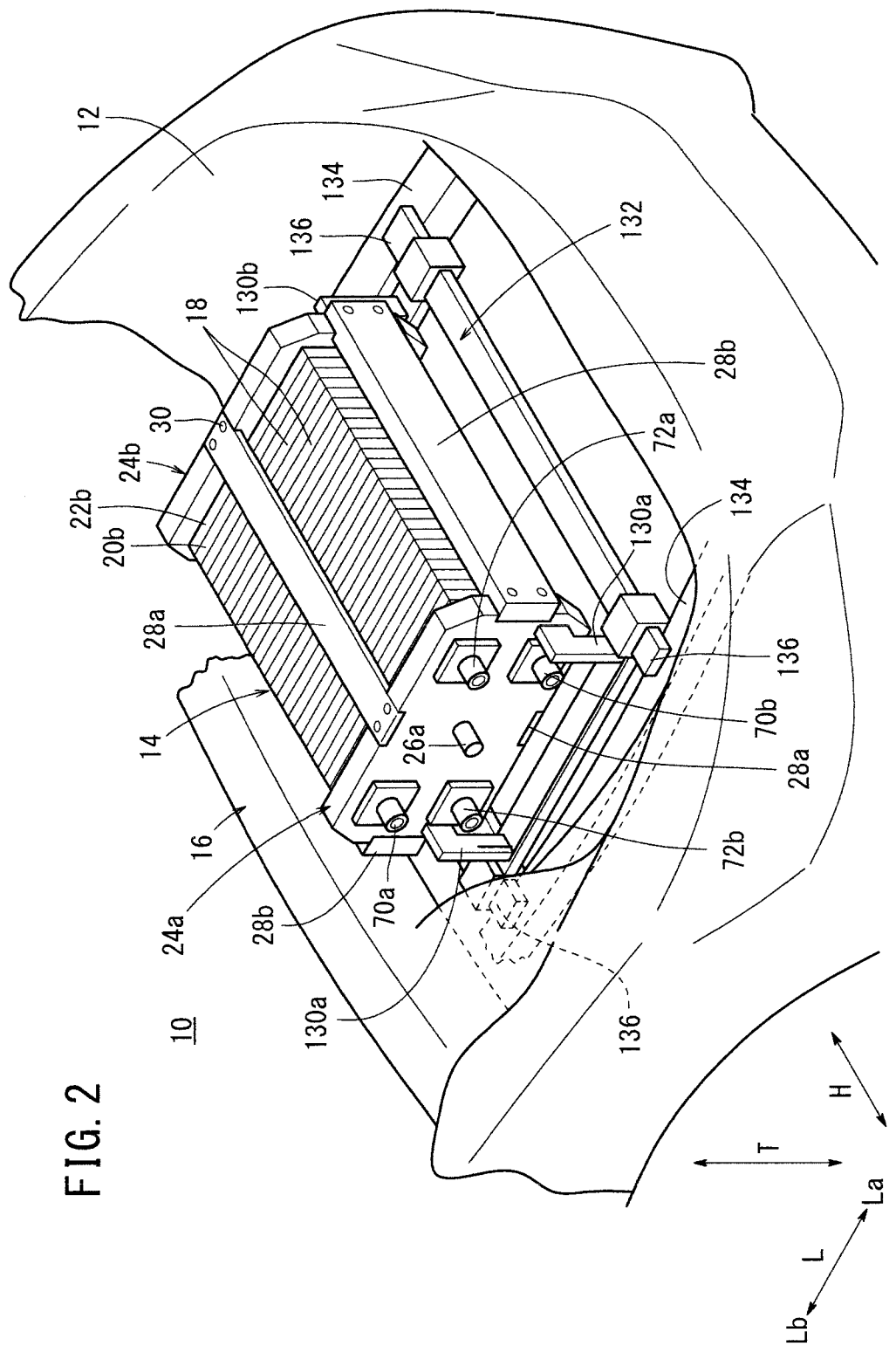
FIG. 2 is perspective view showing main components of the fuel cell vehicle.
Figure 3:
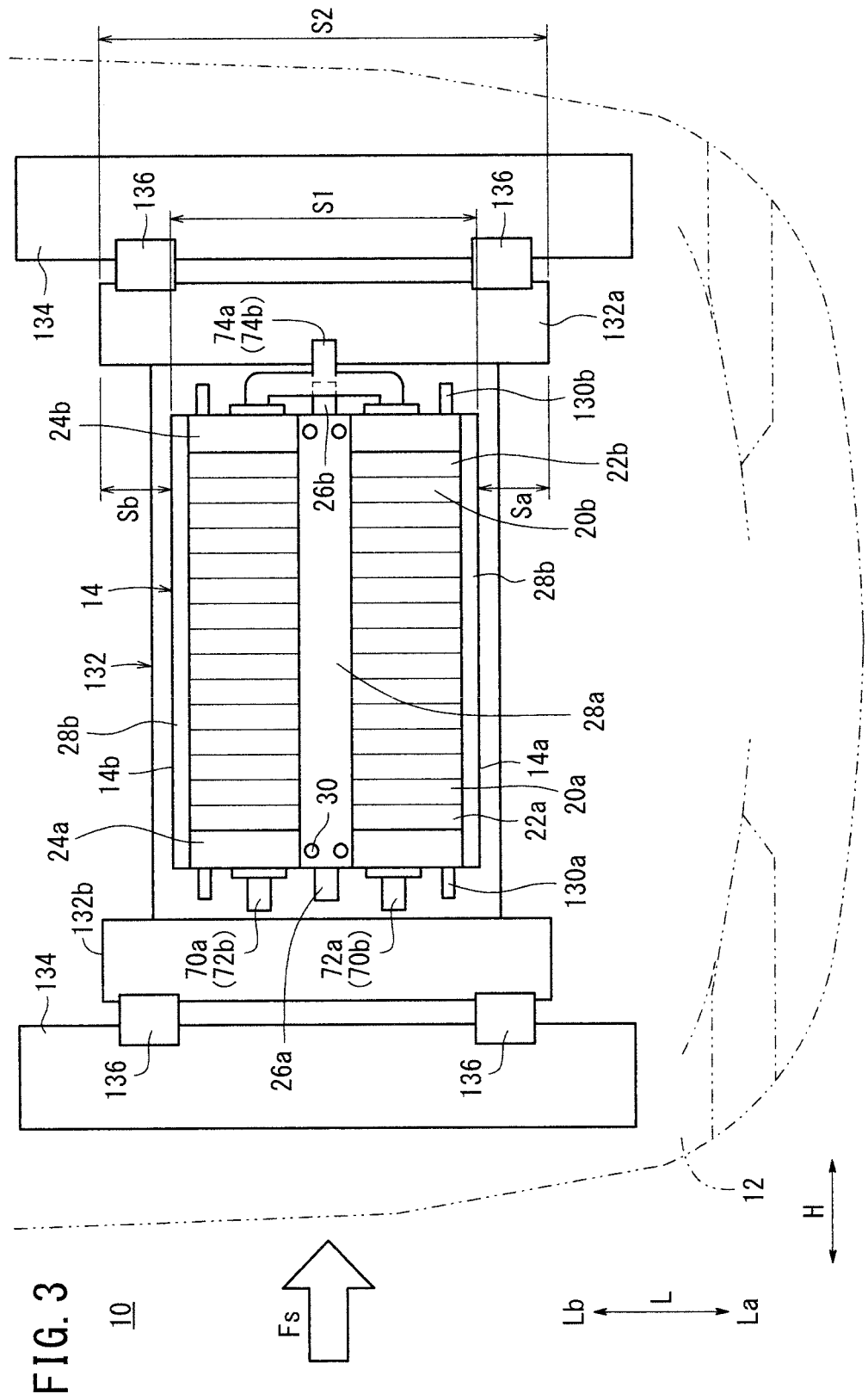
FIG. 3 is a plan view showing main components of the fuel cell vehicle.

As shown in FIGS. 1 to 3, a fuel cell vehicle 10 according to a first embodiment of the present invention includes a fuel cell stack 14 placed in a front box (so called motor room) 12, and a vehicle body frame (vehicle frame) 16 for mounting the fuel cell stack 14 in the front box 12.

The fuel cell stack 14 is formed by stacking a plurality of fuel cells 18 upright in a vehicle width direction of the fuel cell vehicle 10 indicated by an arrow H intersecting with a vehicle length direction thereof indicated an arrow L. The fuel cells 18 may be stacked in a height direction of the fuel cell vehicle 10 indicated by an arrow T.

As shown in FIGS. 2 and 3, at one end of the fuel cells 18 in the stacking direction, a first terminal plate 20a is provided. A first insulating plate 22a is provided outside the first terminal plate 20a, and a first end plate 24a is provided outside the first insulating plate 22a. At the other end of the fuel cells 18 in the stacking direction, a second terminal plate 20b is provided. A second insulating plate 22b is provided outside the second terminal plate 20b, and a second end plate 24b is provided outside the second insulating plate 22b.

A first power output terminal 26a extends from a central position of the first end plate 24a. The first power output terminal 26a is connected to the first terminal plate 20a. A second power output terminal 26b extends from a central position of the second end plate 24b. The second power output terminal 26b is connected to the second terminal plate 20b.

The first end plate 24a and the second end plate 24b have a substantially rectangular shape elongated in a lateral direction, and the corners of the first end plate 24a and the second end plate 24b are cut away. However, the shapes of the first end plate 24a and the second end plate 24b are not limited to these shapes. For example, the first end plate 24a and the second end plate 24b may have a rectangular shape or a square shape.

Both ends of each of coupling bars (tightening members) 28a are fixed to intermediate positions of respective long sides of the first end plate 24a and the second end plate 24b using screws 30. Both ends of each of coupling bars (tightening members) 28b are fixed to intermediate positions of respective short sides of the first end plate 24a and the second end plate 24b using screws 30. By the coupling bars 28a, 28b, a tightening load is applied to the stacked fuel cells 18 of the fuel cell stack 14 in the stacking direction indicated by the arrow H.

Figure 4:
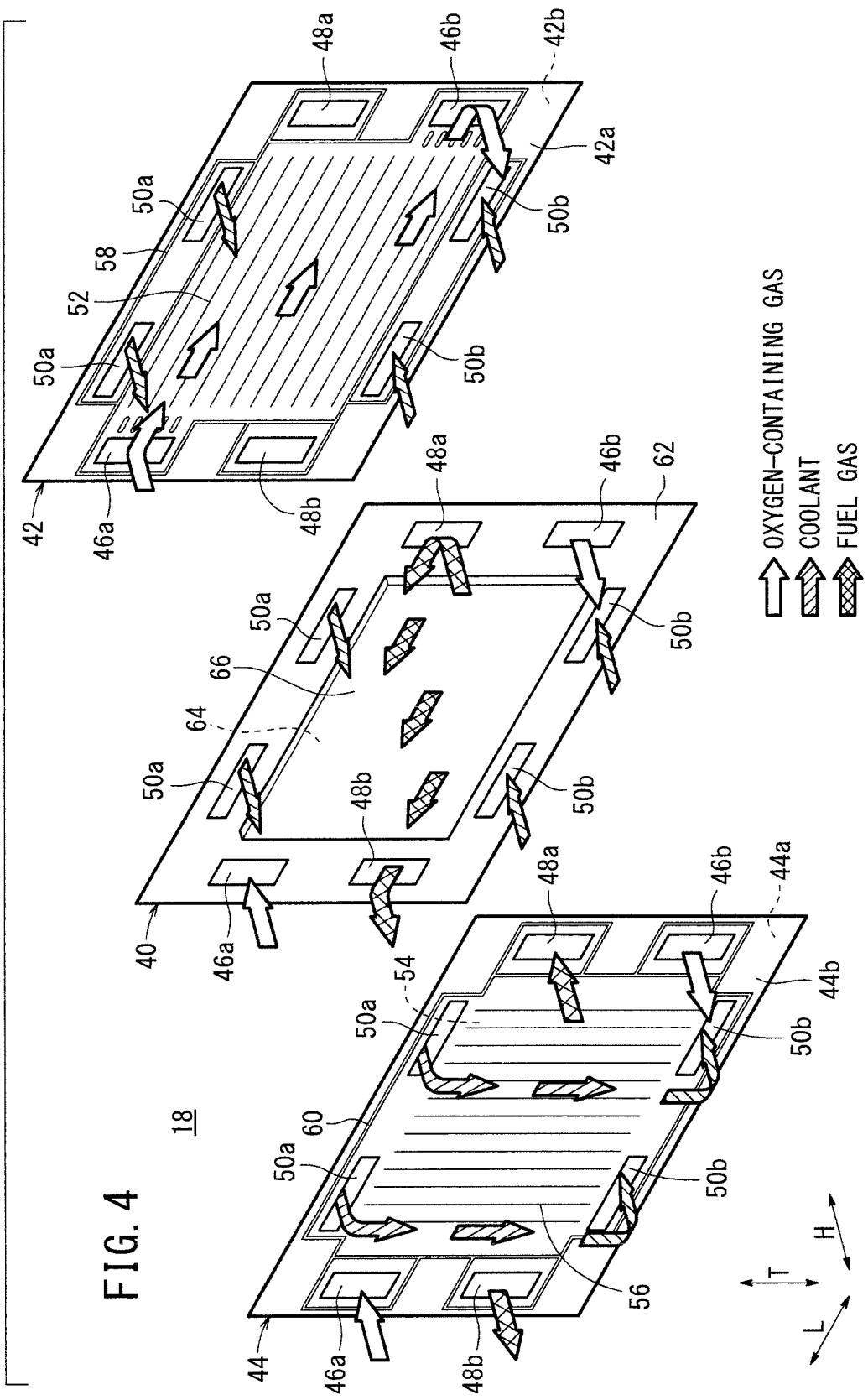
FIG. 4 is an exploded perspective view showing main components of a fuel cell of the fuel cell stack.

As shown in FIG. 4, the fuel cell 18 has a laterally elongated rectangular shape, and is formed by sandwiching a membrane electrode assembly 40 between a first separator 42 and a second separator 44. The first separator 42 and the second separator 44 are metal separators made of, e.g., metal plates such as steel plates, stainless steel plates, aluminum plates, or plated steel sheets. Alternatively, the first separator 42 and the second separator 44 are carbon separators.

At one end of the fuel cell 18 in a horizontal direction indicated by an arrow L in FIG. 4, an oxygen-containing gas supply passage 46a for supplying an oxygen-containing gas and a fuel gas discharge passage 48b for discharging a fuel gas such as a hydrogen-containing gas are arranged in a vertical direction indicated by an arrow T. The oxygen-containing gas supply passage 46a and the fuel gas discharge passage 48b extend through the fuel cell 18 in the stacking direction indicated by the arrow H.

At the other end of the fuel cell 18 in the direction indicated by the arrow L, a fuel gas supply passage 48a for supplying the fuel gas and an oxygen-containing gas discharge passage 46b for discharging the oxygen-containing gas are arranged in the direction indicated by the arrow T. The fuel gas supply passage 48a and the oxygen-containing gas discharge passage 46b extend through the fuel cell 18 in the direction indicated by the arrow H.

A pair of coolant supply passages 50a for supplying a coolant are provided at an upper end of the fuel cell in the direction indicated by the arrow T. A pair of coolant discharge passages 50b for discharging the coolant are provided at a lower end of the fuel cell 18 in the direction indicated by the arrow T.

The first separator 42 has an oxygen-containing gas flow field 52 on its surface 42a facing the membrane electrode assembly 40. The oxygen-containing gas flow field 52 includes a plurality of flow grooves extending in the direction indicated by the arrow L, and the oxygen-containing gas flow field 52 is connected to the oxygen-containing gas supply passage 46a and the oxygen-containing gas discharge passage 46b.

The second separator 44 has a fuel gas flow field 54 on its surface 44a facing the membrane electrode assembly 40. The fuel gas flow field 54 includes a plurality of flow grooves extending in the direction indicated by the arrow L, and the fuel gas flow field 54 is connected to the fuel gas supply passage 48a and the fuel gas discharge passage 48b.

A coolant flow field 56 is formed between a surface 42b of the first separator 42 of one of adjacent fuel cells 18 and a surface 44b of the second separator 44 of the other of the adjacent fuel cells 18. The coolant flow field 56 includes a plurality of flow grooves extending in the direction indicated by an arrow T, and the coolant flow field 56 is connected to the coolant supply passage 50a and the coolant discharge passage 50b.

Seal members 58, 60 are formed integrally with the first separator 42 and the second separator 44, respectively. Alternatively, seal members 58, 60 separate from the first separator 42 and the second separator 44 are provided on the first separator 42 and the second separator 44, respectively. Each of the seal members 58, 60 is an elastic seal member made of seal material, cushion material, packing material, or the like such as an EPDM, an NBR, a fluoro rubber, a silicone rubber, a fluorosilicone rubber, a butyl rubber, a natural rubber, a styrene rubber, a chloroprene rubber, an acrylic rubber, or the like.

The membrane electrode assembly 40 includes a solid polymer electrolyte membrane 62, and a cathode 64 and an anode 66 sandwiching the solid polymer electrolyte membrane 62. The solid polymer electrolyte membrane 62 is formed by impregnating a thin membrane of perfluorosulfonic acid with water, for example.

Each of the cathode 64 and the anode 66 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 64 and the electrode catalyst layer of the anode 66 are formed on both surfaces of the solid polymer electrolyte membrane 62, respectively.

As shown in FIG. 2, an oxygen-containing gas supply manifold 70a, an oxygen-containing gas discharge manifold 70b, a fuel gas supply manifold 72a, and a fuel gas discharge manifold 72b are attached to the first end plate 24a. The oxygen-containing gas supply manifold 70a is connected to the oxygen-containing gas supply passage 46a, the oxygen-containing gas discharge manifold 70b is connected to the oxygen-containing gas discharge passage 46b, the fuel gas supply manifold 72a is connected to the fuel gas supply passage 48a, and the fuel gas discharge manifold 72b is connected to the fuel gas discharge passage 48b.

As shown in FIG. 3, a pair of coolant supply manifolds 74a and a pair of coolant discharge manifolds 74b are attached to the second end plate 24b. The coolant supply manifolds 74a are connected the pair of coolant supply passages 50a, and the coolant discharge manifolds 74b are connected to the pair of coolant discharge passages 50b. The pair of coolant supply manifolds 74a are merged into single supply pipe structure, and likewise, the pair of coolant discharge manifolds 74b are merged into single discharge pipe structure.

Instead of adopting the above structure, all of the manifolds (the oxygen-containing gas supply manifold 70a, the oxygen-containing gas discharge manifold 70b, the fuel gas supply manifold 72a, the fuel gas discharge manifold 72b, the pair of coolant supply manifolds 74a, and the pair of coolant discharge manifolds 74b) may be attached to the first end plate 24a.

Figure 5:
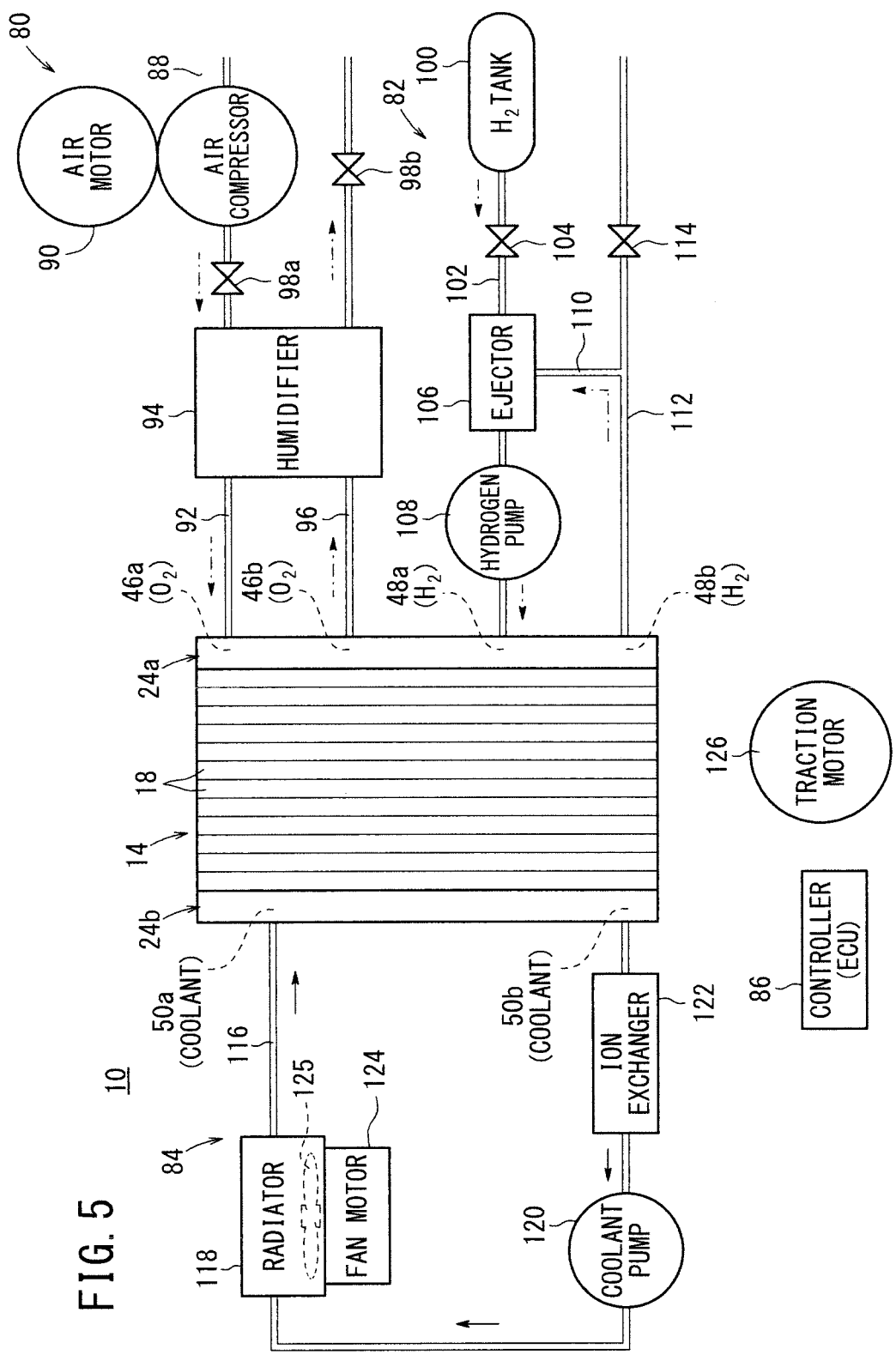
FIG. 5 is a diagram showing auxiliary devices of the fuel cell stack.

As shown in FIG. 5, the fuel cell vehicle 10 includes an oxygen-containing gas supply apparatus 80 for supplying an oxygen-containing gas to the fuel cell stack 14, a fuel gas supply apparatus 82 for supplying a fuel gas to the fuel cell stack 14, a coolant supply apparatus 84 for supplying a coolant to the fuel cell stack 14, and a controller (ECU) 86 for controlling the entire fuel cell vehicle 10.

The oxygen-containing gas supply apparatus 80 includes an air compressor 88 for compressing the atmospheric air, and supplying the compressed air. The air compressor is driven by an air motor 90, and provided in an air supply channel 92. In the air supply channel 92, a humidifier 94 for exchanging water component and heat between a supplied gas and a discharged gas is provided. The air supply channel 92 is connected to the oxygen-containing gas supply passage 46a of the fuel cell stack 14.

The oxygen-containing gas supply apparatus 80 includes an air discharge channel 96 connected to the oxygen-containing gas discharge passage 46b. The air discharge channel 96 is connected to a humidification medium channel (not shown) of the humidifier 94. In the air supply channel 92, an inlet seal valve 98a is provided between the air compressor 88 and the humidifier 94. In the air discharge channel 96, an outlet seal valve 98b is provided downstream of the humidifier 94.

The fuel gas supply apparatus 82 includes a hydrogen tank ($H_2$ tank) 100 for storing high pressure hydrogen. This hydrogen tank 100 is connected to the fuel gas supply passage 48a of the fuel cell stack 14 through a hydrogen supply channel 102. In the hydrogen supply channel 102, a shutoff valve 104, an ejector 106, and as necessary, a hydrogen pump 108 are provided.

A hydrogen gas is supplied from the hydrogen tank 100 to the ejector 106, and the ejector 106 supplies the hydrogen gas to the fuel cell stack 14 through the hydrogen supply channel 102. Further, the ejector 106 suctions, through a hydrogen circulation channel 110, an exhaust gas containing a hydrogen gas that has not been consumed in the fuel cell stack 14, and then supplies the exhaust gas as the fuel gas, again to the fuel cell stack 14.

An off gas channel 112 is connected to the fuel gas discharge passage 48b. The hydrogen circulation channel 110 is connected to a position in the middle of the off gas channel 112, and a purge valve 114 is connected to the off gas channel 112.

The coolant supply apparatus 84 includes a coolant circulation channel 116 which is connected to the coolant supply passage 50a and the coolant discharge passage 50b of the fuel cell stack 14 and through which the coolant is circulated into the fuel cell stack 14. A radiator 118, a coolant pump 120, and an ion exchanger 122 are connected to the coolant circulation channel 116. A fan motor 124 is provided for the radiator 118 in order to drive a radiator fan 125 to send air to the radiator 118.

As described later, in addition to a traction motor 126, air conditioning equipment and various components are mounted in the front box 12 of the fuel cell vehicle 10.

As shown in FIGS. 2 and 3, one end of each of a pair of mounting members 130a is fixed to the first end plate 24a, and another end thereof is fixed to a fuel cell frame member (impact relaxing mechanism) 132. The fuel cell frame member 132 is a mechanism for placement of the fuel cell stack. One end of each of a pair of mounting members 130b is fixed to the second end plate 24b, and another end thereof is fixed to the frame member 132.

As the mechanism for placement of the fuel cell stack, instead of the frame member 132, for example, a motor mount (not shown) for mounting the traction motor 126 may be used to place the fuel cell stack 14 on the motor mount.

As shown in FIGS. 1 to 3, the frame member 132 is fixed to a side frame 134, which is a component of the fuel cell vehicle 10, through a bracket 136. The side frame 134 is a part of the vehicle body frame 16.

As shown in FIG. 1, a high voltage system unit 140 is fixed below the frame member 132. The high voltage system unit 140 includes, for example, a PDU (power drive unit), a hydrogen pump PDU, a DC-DC converter, a fuel cell VCU (voltage control unit), and a fuel cell contactor, and additionally includes the shutoff valve 104 and the hydrogen pump 108 of the fuel gas supply apparatus 82, and various other valves, an air conditioning heater, etc.

The outer size of the high voltage system unit 140 is smaller than the outer size of the fuel cell stack 14. The high voltage system unit 140 is provided below the fuel cell stack 14 within the projection area of the fuel cell stack 14. Therefore, since the high voltage system unit 140 provided within the area of the fuel cell stack 14 is protected, the high voltage system unit 140 may have low rigidity in comparison with the rigidity of the fuel cell stack 14.

Further, the air compressor 88, the humidifier 94, the inlet seal valve 98a, and the outlet seal valve 98b are attached to the frame member 132. It should be noted that these components may be attached to the vehicle body frame 16.

The traction motor 126 is attached to the vehicle body frame 16, and the air motor 90 of the oxygen-containing gas supply apparatus 80 is attached to the traction motor 126 using a plurality of coupling members 142.

A radiator 118 is provided in the front box 12, on the front side in the front-rear direction of the vehicle indicated by an arrow La. A dash board panel 146 as a partition between the front box 12 and a passenger compartment 144 is provided on the rear side of the front box 12 in the front-rear direction of the vehicle indicated by an arrow Lb.

In the first embodiment, the frame member 132 forms an impact relaxing mechanism for relaxing an impact applied from the outside, and which has a length S2 which is longer than the length S1 of the fuel cell stack 14 in the front-rear direction of the vehicle indicated by the arrow L.

As shown in FIG. 3, the fuel cell stack 14 and the frame member 132 have an overlapped portion in which the fuel cell stack 14 and the frame member 132 are overlapped with each other in the vehicle width direction indicated by the arrow H in a plan view of the fuel cell vehicle 10. A front end 14a of the fuel cell stack 14 in the front-rear direction of the vehicle is positioned rearward of a front end 132a of the frame member 132 in the vehicle front-rear direction so as to be spaced from the front end 132a by a distance Sa. A rear end 14b of the fuel cell stack 14 in the vehicle front-rear direction is positioned forward of a rear end 132b in the vehicle front-rear direction so as to be spaced from the rear end 132b by a distance Sb.

As shown in FIG. 1, the distance Sa between the front end 14a of the fuel cell stack 14 in the front-rear direction of the vehicle and the front end 132a of the frame member 132 in the front-rear direction of the vehicle is greater than the dimension S3 of the fan motor 124 attached to the rear portion of the radiator 118 in the front-rear direction of the vehicle (Sa>S3).

As shown in FIG. 1, the distance Sb between the rear end 14b of the fuel cell stack 14 in the front-rear direction of the vehicle and the rear end 132b of the frame member 132 in the front-rear direction of the vehicle is determined such that when the frame member 132 is brought into abutment against the dash board panel 146 by an impact or the like applied from the outside, a gap is formed between the rear end 14b of the fuel cell stack 14 in the front-rear direction of the vehicle and the dash board panel 146.

Operation of the fuel cell vehicle 10 will be described below.

Firstly, as shown in FIG. 5, an oxygen-containing gas (air) is supplied to the air supply channel 92 through the air compressor 88 of the oxygen-containing gas supply apparatus 80. The oxygen-containing gas is humidified when it passes through the humidifier 94. Thereafter, the humidified oxygen-containing gas is supplied to the oxygen-containing gas supply passage 46a of the fuel cell stack 14.

In the meanwhile, in the fuel gas supply apparatus 82, when the shutoff valve 104 is opened, a fuel gas (hydrogen gas) is supplied from the hydrogen tank 100 to the hydrogen supply channel 102. After the fuel gas flows through the ejector 106, by operation of the hydrogen pump 108, the fuel gas is supplied to the fuel gas supply passage 48a of the fuel cell stack 14.

Further, in the coolant supply apparatus 84, by operation of the coolant pump 120, a coolant such as pure water, ethylene glycol, oil, or the like is supplied from the coolant circulation channel 116 to the coolant supply passage 50a of the fuel cell stack 14.

Therefore, as shown in FIG. 4, the oxygen-containing gas flows from the oxygen-containing gas supply passage 46a into the oxygen-containing gas flow field 52 of the first separator 42. The oxygen-containing gas moves in the direction indicated by the arrow L, and the oxygen-containing gas is supplied to the cathode 64 of the membrane electrode assembly 40.

In the meanwhile, the fuel gas is supplied from the fuel gas supply passage 48a to the fuel gas flow field 54 of the second separator 44. The fuel gas moves in the direction indicated by the arrow L, and the fuel gas is supplied to the anode 66 of the membrane electrode assembly 40.

Thus, in the membrane electrode assembly 40, the oxygen-containing gas supplied to the cathode 64 and the fuel gas supplied to the anode 66 are consumed in electro-chemical reactions at catalyst layers of the cathode 64 and the anode 66 for generating electricity. Therefore, electrical energy is supplied to the traction motor 126 for allowing traveling of the fuel cell vehicle 10.

Then, as shown in FIG. 5, the oxygen-containing gas discharged from the cathode 64 to the oxygen-containing gas discharge passage 46b flows through the air discharge channel 96, and flows into the humidifier 94 to humidify a fresh oxygen-containing gas. In the meanwhile, the fuel gas discharged from the anode 66 to the fuel gas discharge passage 48b is suctioned by the ejector 106, and is supplied to the fuel cell stack 14. After the coolant flows into the coolant flow field 56, the coolant cools the membrane electrode assembly 40, and then the coolant is returned to the coolant circulation channel 116.

As described above, electrical energy supplied from the fuel cell stack 14 is utilized for allowing travel of the fuel cell vehicle 10. As shown in FIG. 1, when an external load F as an impact is applied to the fuel cell vehicle 10 from the front side, the front portion of the fuel cell vehicle 10 tends to be deformed inwardly.

In the first embodiment, as shown in FIG. 3, the frame member 132 forms the impact relaxing mechanism. The front end 132a of the frame member 132 in the front-rear direction of the vehicle protrudes forward beyond the front end 14a of the fuel cell stack 14 in the front-rear direction of the vehicle by the distance Sa. The rear end 132b of the frame member 132 in the front-rear direction of the vehicle protrudes rearward beyond the rear end 14b of the fuel cell stack 14 in the front-rear direction of the vehicle by the distance Sb.

In the structure, the fuel cell stack 14 is provided inside the frame member 132 in the front-rear direction of the vehicle. Therefore, even if an external load F is applied to the fuel cell vehicle 10, no external load F is directly applied to the fuel cell stack 14. Thus, it is not necessary to use any enclosure having relatively high strength to cover the fuel cell stack 14.

Accordingly, with the simple and economical structure, it becomes possible to prevent an external load F from being directly applied to the fuel cells 18 as much as possible, and reliably protect the fuel cells 18.

Further, by application of an external load F, the radiator 118 may move rearward in the front-rear direction of the vehicle indicated by the arrow Lb. In this regard, the dimension S3, in the vehicle front-rear direction, of the fan motor 124 protruding backward of the radiator 118 is smaller than the distance Sa between the front end 14a of the fuel cell stack 14 in the vehicle front-rear direction and the front end 132a of the frame member 132 in the vehicle front-rear direction. In the structure, even if the radiator 118 moves and collides with the frame member 132, the fan motor 124 does not abut against the fuel cell stack 14. Therefore, it is possible to protect the fuel cell stack 14 reliably.

Further, by application of an external load F, the frame member 132 may move rearward in the front-rear direction of the vehicle indicated by the arrow Lb, and abut against the dash board panel 146. In this regard, a gap is formed between the rear end 14b of the fuel cell stack 14 in the vehicle front-rear direction and the dash board panel 146. Therefore, it becomes possible to prevent the fuel cell stack 14 from abutting against the dash board panel 146, as much as possible.

Furthermore, in the first embodiment, as shown in FIG. 3, both ends of the fuel cell stack 14 in the vehicle width direction indicated by the arrow H are positioned in the inside between both ends of the frame member 132 in the vehicle width direction. In the structure, when an external load Fs is applied to the fuel cell vehicle 10 in the lateral direction, the external load Fs is not directly applied to the fuel cell stack 14.

Figure 6:
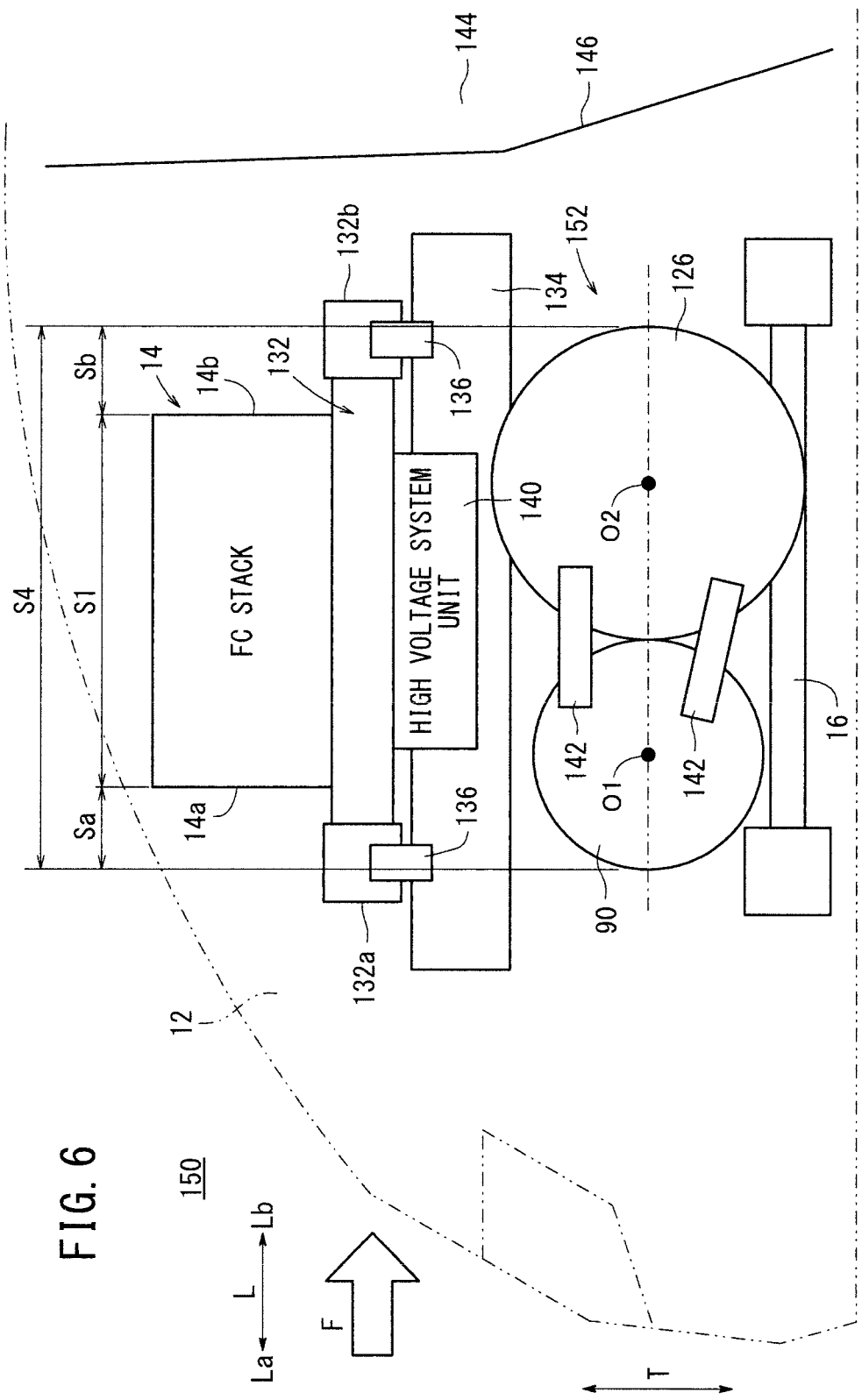
FIG. 6 is a side view showing main components of a fuel cell vehicle according to a second embodiment of the present invention.

FIG. 6 is a side view showing main components of a fuel cell vehicle 150 according to a second embodiment of the present invention.

The constituent elements that are identical to those of the fuel cell vehicle 10 according to the first embodiment are labeled with the same reference numerals, and description thereof will be omitted. Likewise, also in third and fourth embodiments described later, constituent elements that are identical to those of the fuel cell vehicle 10 according to the first embodiment are labeled with the same reference numerals, and description thereof will be omitted.

In the fuel cell vehicle 150, a traction motor 126 and an air motor 90 form an impact relaxing mechanism 152. The air motor 90 and the traction motor 126 are arranged next to each other in the front-rear direction of the vehicle, and the shaft centers O1 and O2 of the air motor 90 and the traction motor 126 are arranged on the same plane in a horizontal direction.

Figure 7:
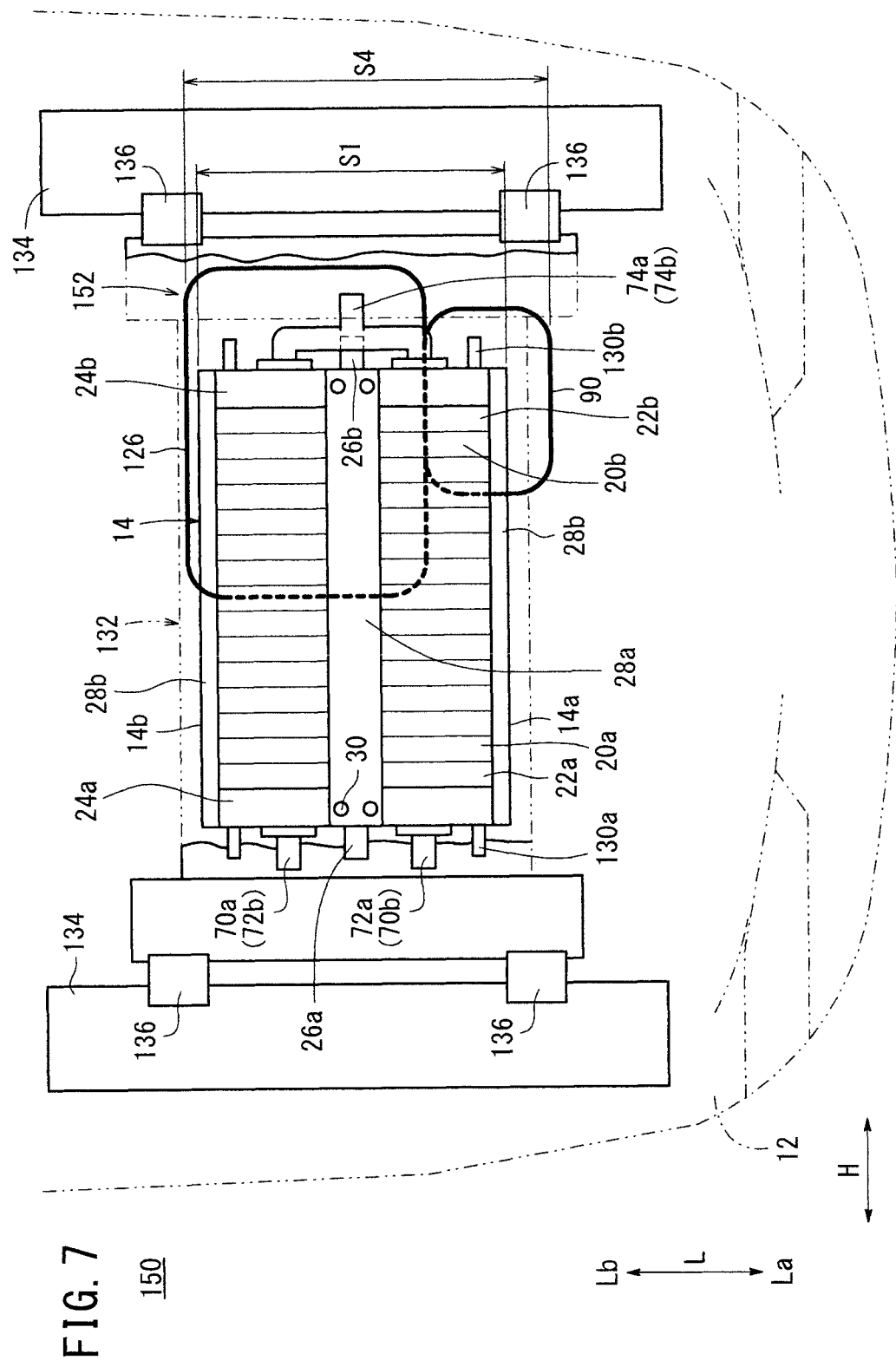
FIG. 7 is a plan view showing main components of the fuel cell vehicle.

In the impact relaxing mechanism 152, the maximum distance S4 in the horizontal direction from the outer circumference of the traction motor 126 to the outer circumference of the air motor 90 (distance in a horizontal line extending along the diameter of the traction motor 126 and the diameter of the air motor 90) is greater than the length S1 of the fuel cell stack 14 in the front-rear direction of the vehicle (see FIGS. 6 and 7). It should be noted that the traction motor 126 and the air motor 90 may be arranged with inclination in the front-rear direction of the vehicle as long as the length of the impact relaxing mechanism 152 in the front-rear direction of the vehicle is greater than the length S1 of the fuel cell stack 14 in the front-rear direction of the vehicle.

In the second embodiment, the impact relaxing mechanism 152 is provided, and the load applied to the fuel cell stack 14 in the front-rear direction of the vehicle is relaxed by the impact relaxing mechanism 152.

Accordingly, with the simple and economical structure, the same advantages as in the case of the first embodiment are obtained. For example, it is possible to prevent the external load F from being directly applied to the fuel cells 18 as much as possible.

Further, in the second embodiment, the impact relaxing mechanism 152 includes the traction motor 126 and the air motor 90 each having high rigidity, and a reaction force is produced in opposition to the external load F. Therefore, it is possible to suitably receive the external load F. Moreover, the shaft center O1 of the air motor 90 and the shaft center O2 of the traction motor 126 are arranged on the same plane in the horizontal direction. In the structure, the external load F can be received by the traction motor 126 and the air motor 90 still more reliably, and it becomes possible to use low rigidity mounting structures for the traction motor 126 and the air motor 90 with economically.

Figure 8:
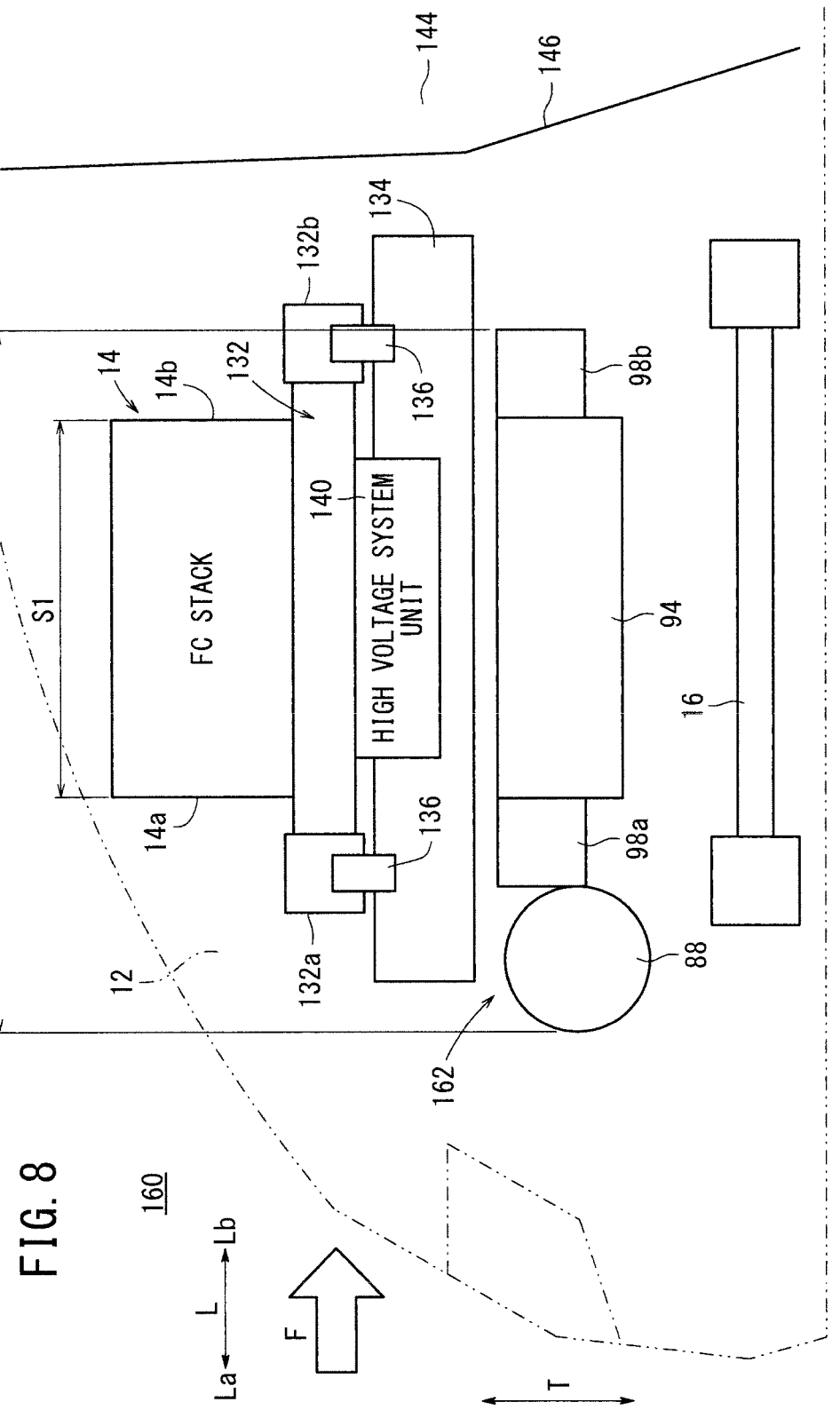
FIG. 8 is a side view showing main components of a fuel cell vehicle according to a third embodiment of the present invention.
Figure 9:
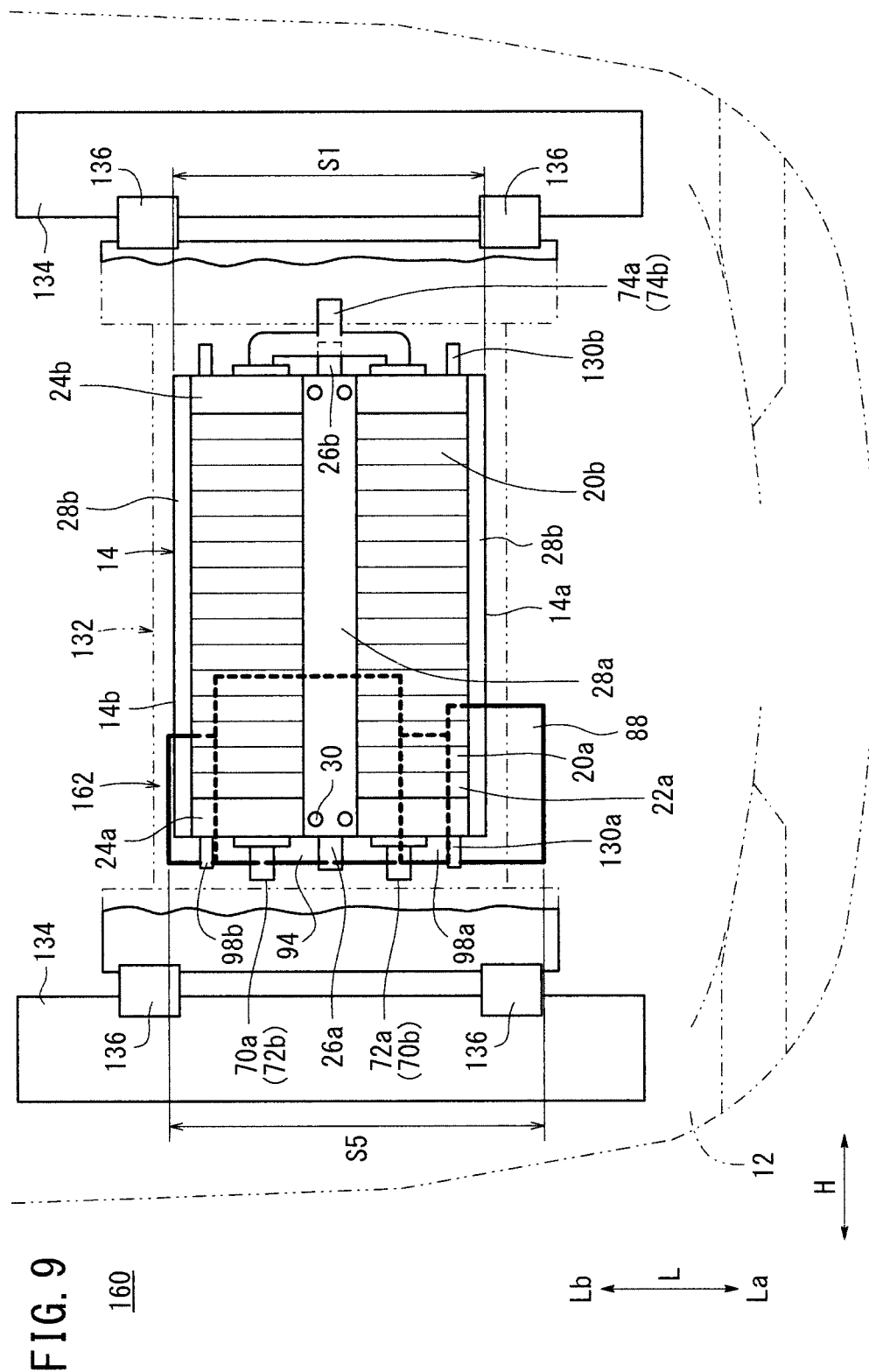
FIG. 9 is a plan view showing main components of the fuel cell vehicle.

As shown in FIGS. 8 and 9, a fuel cell vehicle 160 according to a third embodiment of the present invention includes an impact relaxing mechanism 162. The impact relaxing mechanism 162 includes various components of the oxygen-containing gas supply apparatus 80 such as the air compressor 88, the inlet seal valve 98a, the humidifier 94, and the outlet seal valve 98b. These components are arranged in the front-rear direction of the vehicle (i.e., in the direction indicated by an arrow L).

In the impact relaxing mechanism 162, the length S5 in the front-rear direction of the vehicle is larger than the length S1 of the fuel cell stack 14 in the front-rear direction of the vehicle. The fuel cell stack 14 is disposed within the range of the length S5 of the impact relaxing mechanism 162, and the impact relaxing mechanism 162 protrudes outward beyond one side portion of the fuel cell stack 14 in the width direction (see FIG. 9).

In the third embodiment, the impact relaxing mechanism 162 is provided, and this impact relaxing mechanism 162 relaxes the load applied to the fuel cell stack 14 in the front-rear direction of the vehicle.

Thus, with the simple and economical structure, the same advantages as in the case of the first embodiment are obtained. For example, it is possible to prevent the external load F from being directly applied to the fuel cells 18 as much as possible.

Further, the impact relaxing mechanism 162 is made up of devices of the oxygen-containing gas system, which are inexpensive in comparison with devices of the hydrogen system. Therefore, operation for replacement of such devices is simplified economically.

Figure 10:
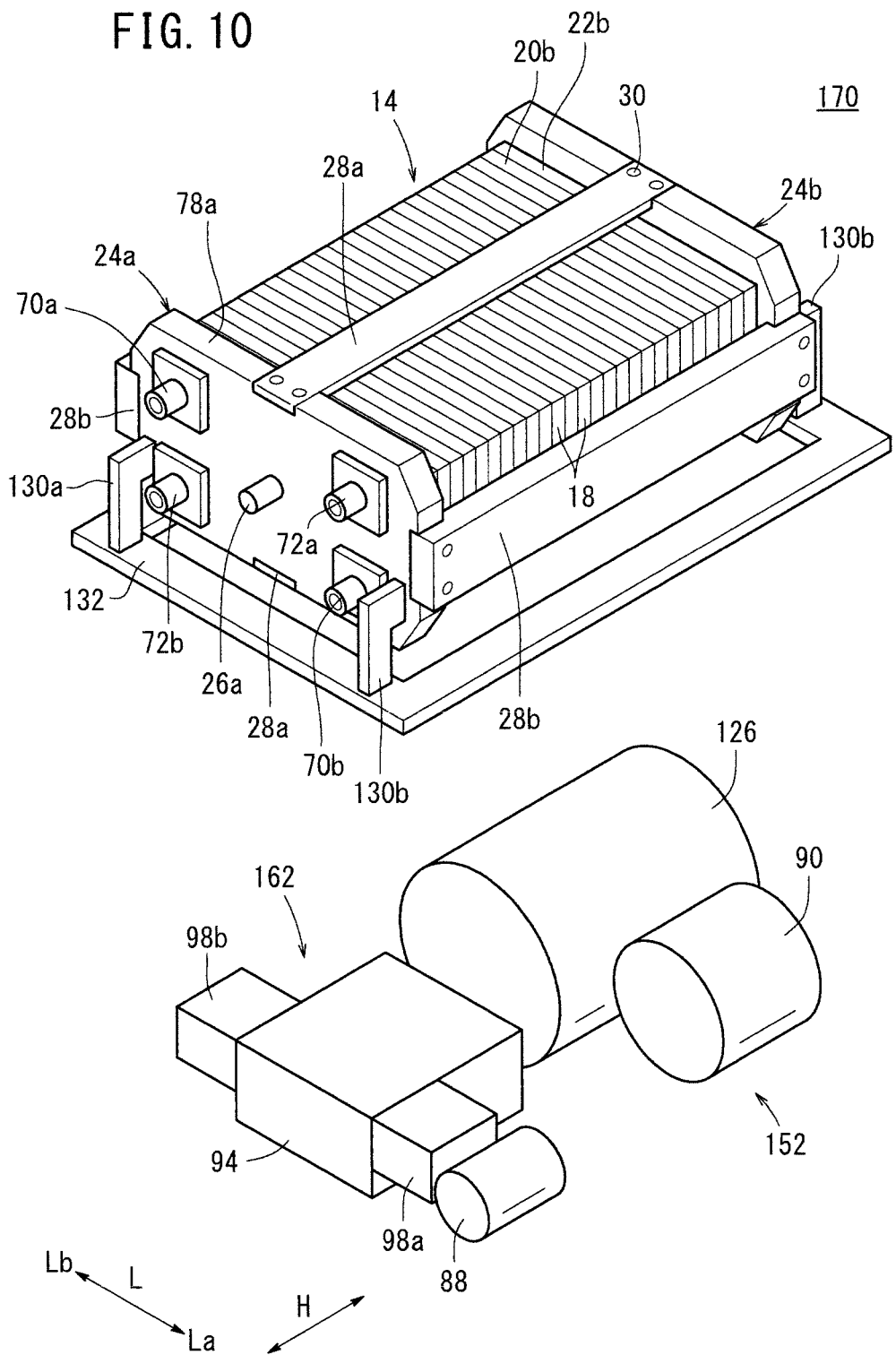
FIG. 10 is an exploded perspective view showing main components of a fuel cell vehicle according to a fourth embodiment of the present invention.
Figure 11:
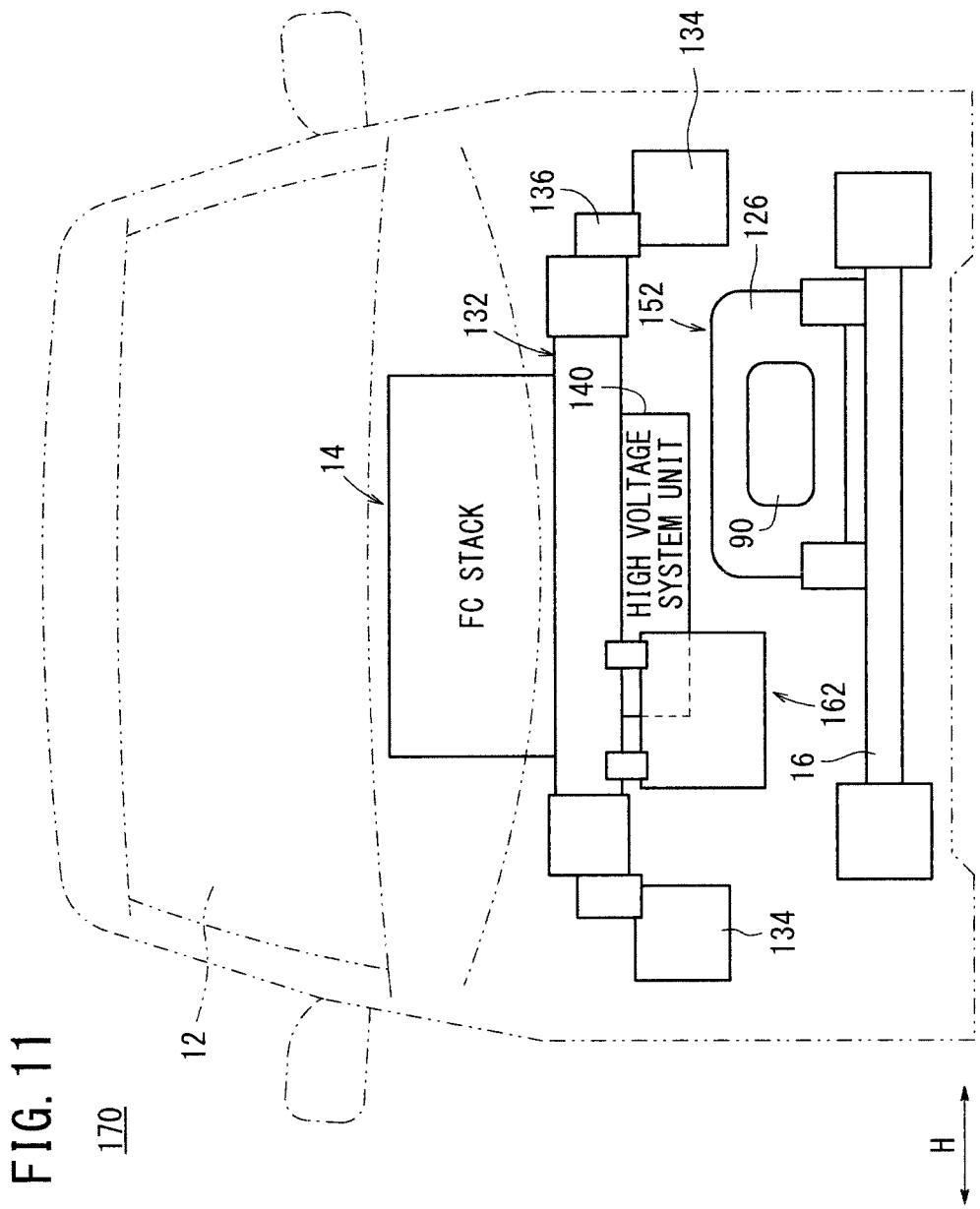
FIG. 11 is a front view showing the fuel cell vehicle.
Figure 12:
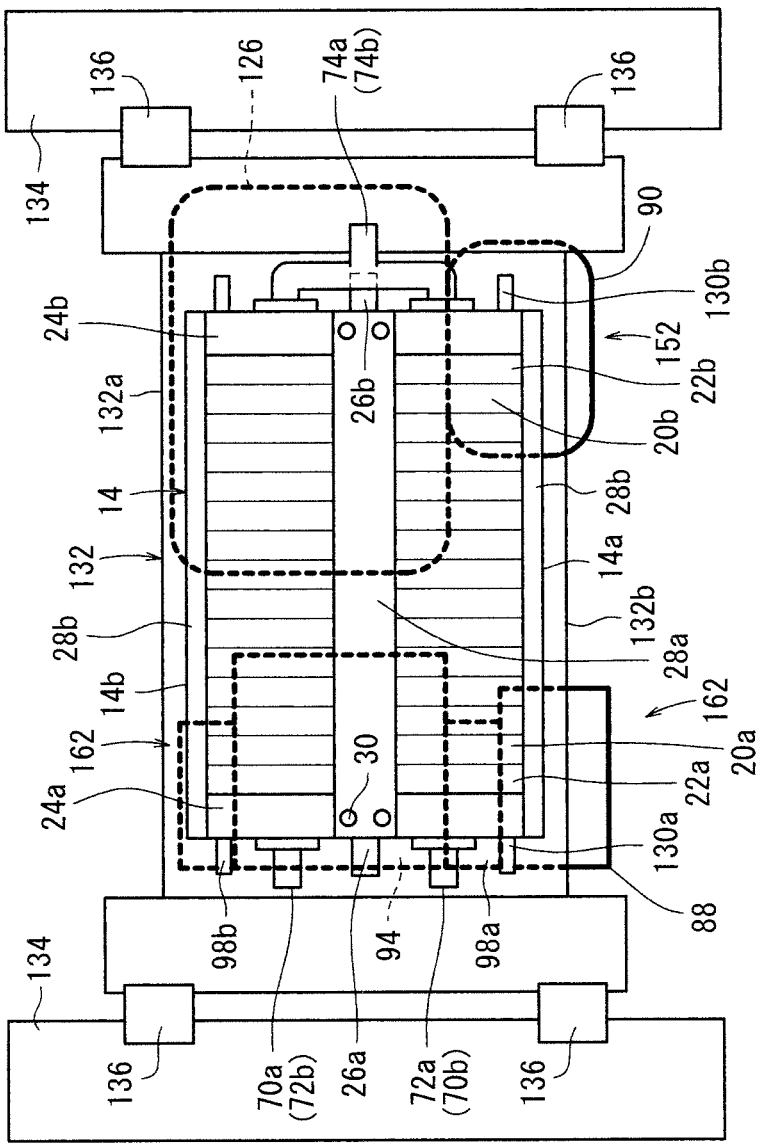
FIG. 12 is a plan view showing main components of the fuel cell vehicle.

As shown in FIGS. 10 to 12, a fuel cell vehicle 170 according to a fourth embodiment of the present invention is made up of combination of the first to third embodiments.

Specifically, for protection of the fuel cell stack 14, the fuel cell vehicle 170 includes the frame member (impact relaxing mechanism) 132, the impact relaxing mechanism 152, and the impact relaxing mechanism 162.

In the structure, in the fourth embodiment, when the external load F is applied, at least one of the frame member 132, the impact relaxing mechanism 152, and the impact relaxing mechanism 162 can receive the external load F suitably. Accordingly, it becomes possible to protect the fuel cell stack 14 further reliably. Further, the same advantages as in the cases of the first to third embodiments are obtained.

The invention claimed is:

1. A fuel cell vehicle comprising:
 a fuel cell stack formed by stacking a plurality of fuel cells, the fuel cells each generating electrical energy by electrochemical reactions of a fuel gas and an oxygen-containing gas;
 a front box;
 a vehicle frame configured to mount the fuel cell stack in the front box;
 a radiator provided on a front side of the fuel cell stack in a vehicle front-rear direction, a coolant used for cooling the fuel cells passing through the radiator; and
 a fan motor provided on a rear side of the radiator and configured to drive a radiator fan to send air to the radiator; and
 an impact relaxing mechanism configured to relax an impact applied from an outside, a length of the impact relaxing mechanism being greater than a length of the fuel cell stack in the vehicle front-rear direction, the impact relaxing mechanism being attached to the vehicle frame for placement of the fuel cell stack,
 wherein the fuel cell stack and the impact relaxing mechanism have an overlapped portion in which the fuel cell stack and the impact relaxing mechanism are overlapped with each other in a vehicle width direction in a plan view of the fuel cell vehicle;
 a front end of the fuel cell stack in the vehicle front-rear direction is positioned rearward of a front end of the impact relaxing mechanism in the vehicle front-rear direction;
 a rear end of the fuel cell stack in the vehicle front-rear direction is positioned forward of a rear end of the impact relaxing mechanism in the vehicle front-rear direction; and
 a distance between the front end of the fuel cell stack in the vehicle front-rear direction and the front end of the impact relaxing mechanism in the vehicle front-rear direction is greater than a dimension of the fan motor in the vehicle front-rear direction.

2. The fuel cell vehicle according to claim 1, wherein a dash board panel as a partition between the front box and a passenger compartment is provided on a rear side of the front box in the vehicle front-rear direction; and
 a distance between the rear end of the fuel cell stack in the vehicle front-rear direction and the rear end of the impact relaxing mechanism in the vehicle front-rear direction is dimensioned such that when the impact relaxing mechanism abuts against the dash board panel, a gap is formed between the rear end of the fuel cell stack in the vehicle front-rear direction and the dash board panel.

3. The fuel cell vehicle according to claim 1, further comprising:
   a traction motor configured to allow travel of the fuel cell vehicle;
   an air compressor configured to supply the oxygen-containing gas to the fuel cell stack; and
   an air motor configured to drive the air compressor,
   wherein the impact relaxing mechanism comprises the traction motor and the air motor arranged next to each other in parallel.

4. The fuel cell vehicle according to claim 3, wherein the shaft center of the traction motor and the shaft center of the air motor are arranged on the same plane in a horizontal direction.

5. The fuel cell vehicle according to claim 1, wherein the impact relaxing mechanism comprises a fuel cell auxiliary device for circulation of the oxygen-containing gas used in the fuel cells or an air conditioning auxiliary device of the fuel cell vehicle.

6. The fuel cell vehicle according to claim 1, further comprising a control device configured to control the fuel cell vehicle; and
   a high voltage system unit including the control device,
   wherein the high voltage system unit is shorter than the fuel cell stack in the vehicle front-rear direction.

7. The fuel cell vehicle according to claim 1, wherein the fuel cell stack is formed by stacking the fuel cells in a vehicle width direction or a vehicle height direction.

\* \* \* \* \*